(12) United States Patent
Nagase et al.

(10) Patent No.: US 12,105,019 B2
(45) Date of Patent: *Oct. 1, 2024

(54) DENSITY MEASUREMENT DEVICE

(71) Applicant: FUJIKIN INCORPORATED, Osaka (JP)

(72) Inventors: Masaaki Nagase, Osaka (JP); Masahiko Takimoto, Osaka (JP); Kazuteru Tanaka, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 311 days.

This patent is subject to a terminal disclaimer.

(21) Appl. No.: 17/637,617

(22) PCT Filed: Aug. 31, 2020

(86) PCT No.: PCT/JP2020/032827
§ 371 (c)(1),
(2) Date: Feb. 23, 2022

(87) PCT Pub. No.: WO2021/054097
PCT Pub. Date: Mar. 25, 2021

(65) Prior Publication Data
US 2022/0283081 A1 Sep. 8, 2022

(30) Foreign Application Priority Data
Sep. 18, 2019 (JP) ................. 2019-169331

(51) Int. Cl.
*G01N 21/27* (2006.01)
*G01N 21/05* (2006.01)
*G01N 21/17* (2006.01)

(52) U.S. Cl.
CPC ........... *G01N 21/274* (2013.01); *G01N 21/05* (2013.01); *G01N 21/1717* (2013.01); *G01N 2021/1731* (2013.01)

(58) Field of Classification Search
CPC .. G01N 21/05; G01N 21/274; G01N 21/1717; G01N 21/61
See application file for complete search history.

(56) References Cited

U.S. PATENT DOCUMENTS

| 5,841,536 A | 11/1998 | Dimmick |
| 2007/0046951 A1 | 3/2007 | Hill |

(Continued)

FOREIGN PATENT DOCUMENTS

| GB | 2560870 A | * 10/2018 | ........... G01N 21/256 |
| JP | H07-103895 A | 4/1995 | |

(Continued)

OTHER PUBLICATIONS

International Search Report issued in PCT/JP2020/032827; mailed Oct. 13, 2020.

*Primary Examiner* — Uzma Alam
*Assistant Examiner* — Justin J Van Cleave
(74) *Attorney, Agent, or Firm* — Studebaker & Brackett PC (57) ABSTRACT

The concentration measurement device 100 includes an electric unit 20 having a light source 22 and a photodetector 24, a fluid unit 10 having a measurement cell 1, a first light-transmission member 11 for transmitting light from the light source to the measurement cell, a second light transmission member 12 for transmitting light from the measurement cell to the photodetector, a lens 3A provided in the fluid unit, the lens 3A being arranged such that light from the first light transmission member is to be incident on the first position and light is to be emitted from the second position to the second light transmission member, a pressure sensor (Continued)

5 for measuring pressure of fluid flowing through the measurement cell, and an arithmetic circuit 28 for detecting concentration of the fluid flowing through the measurement cell, the arithmetic circuit being configured to calculate the fluid concentration based on the output of the photodetector and a correction factor related to the pressure output by the pressure sensor and the concentration of fluid in order to reduce the measurement error due to the refractive index of the fluid.

3 Claims, 4 Drawing Sheets

(56) References Cited

U.S. PATENT DOCUMENTS

| | | |
|---|---|---|
| 2016/0084700 A1 | 3/2016 | Nagase et al. |
| 2016/0178362 A1 | 6/2016 | Iseli et al. |
| 2018/0045500 A1 | 2/2018 | Chen et al. |
| 2018/0217054 A1 | 8/2018 | Deguchi et al. |
| 2019/0271636 A1 | 9/2019 | Deguchi et al. |

FOREIGN PATENT DOCUMENTS

| | | | | |
|---|---|---|---|---|
| JP | H10-221020 A | | 8/1998 | |
| JP | 2009-506330 A | | 2/2009 | |
| JP | 2014-219294 A | | 11/2014 | |
| JP | 2018017644 A | * | 2/2018 | ......... G01N 21/0303 |
| JP | 2018025499 A | * | 2/2018 | |
| WO | 2017/029792 A1 | | 2/2017 | |
| WO | 2018/021311 A1 | | 2/2018 | |

* cited by examiner

|  | PRESSURE | | | | TB |
|---|---|---|---|---|---|
| CONCENTRATION | | P1 | P2 | ... | Pn |
| | n1 | ΔC11 | ΔC21 | | ΔCn1 |
| | n2 | ΔC12 | ΔC22 | | ΔCn2 |
| | ... | | | | |
| | nn | ΔC1n | ΔC2n | | ΔCnn |

DENSITY MEASUREMENT DEVICE

TECHNICAL FIELD

The present invention relates to a concentration measurement device, and more particularly, to a concentration measurement device for measuring a concentration of a fluid based on an intensity of light transmitted through a measurement cell.

BACKGROUND OF INVENTION

Conventionally, a concentration measurement device (so-called in-line type concentration measurement device), which is incorporated in a gas supply line for supplying a raw material gas to a semiconductor manufacturing equipment and is configured to measure the concentration of a gas, has been known. As the raw material gas, for example, an organometallic (MO) gas obtained from a liquid material or a solid material may be used.

In this type of concentration measurement device, light of a predetermined wavelength from a light source is made incident on a measurement cell through which a gas flows, and transmitted light passing through the measurement cell is received by a light receiving element, whereby absorbance is measured. Further, from the measured absorbance, the concentration of the measured gas can be determined based on Lambert-Beer's law (for example, Patent Documents 1 to 3).

In this specification, various transmitted light detection structures used to detect the concentration of a fluid are broadly referred to as measurement cells. The measurement cells include not only the separately provided measurement cell branched from the fluid supply line, but also the in-line type transmitted light detection structure provided in the middle of the fluid supply line as shown in Patent Documents 1 to 3.

PRIOR ART LITERATURE PATENT DOCUMENTS

Patent Document 1: Japanese Laid-Open Patent Publication No. 2014-219294.
Patent Document 2: International Patent Publication No. WO2017/029792.
Patent Document 3: International Patent Publication No. WO2018/021311.

Problems to be Solved by Invention

In the measurement cell of the concentration measurement device described above, usually, the parallel light is incident on the cell using a collimator. For example, in the reflection type concentration measurement device described in Patent Document 3, a convex lens is arranged as a collimator lens in front of a translucent window portion provided at one end of the measurement cell, and a reflection member is arranged at the other end of the measurement cell. In this configuration, light passing through the convex lens and being incident on the cell as parallel light is reflected by the reflecting member at the other end, and the light having one round trip in the cell passes through the convex lens again and is guided to a photodetector.

When guiding the incident light and the reflected light into different paths in the reflective measurement cell, the incident light (beam diameter is, for example, several millimeters or so) is irradiated to a position shifted from the lens center or the optical axis of the lens, and then the incident light is refracted when passing through the lens. Further, light emitted from the lens is not incident perfectly perpendicular to the window surface of the translucent window portion provided at the end of the measurement cell and is incident at an angle slightly inclined with respect to the central axis direction of the measurement cell. Then, light traveling in the cell and reflected by the reflective member is also refracted at the window portion after traveling in the cell at an angle slightly inclined with respect to the central axis direction of the measurement cell, and emits through a position shifted from the center of the lens (see FIG. 2).

In this manner, when light is incident on the measurement cell at a slightly inclined angle, if the refractive index of the gas in the measurement cell changes, the refractive angle at the interface between the window portion and the gas changes subtly. The present inventors have found that a change in the refractive index of the intra-cell medium causes a subtle change in the optical path of the light transmitting in the measurement cell, which can increase the error of the concentration measurement.

The present invention has been made in view of the above-mentioned problems, and the main object thereof is to provide a concentration measurement device capable of suppressing an increase in concentration measurement error due to a change in the refractive index of a medium in a measurement cell.

Means for Solving Problem

The concentration measurement device according to an embodiment of the present invention includes a fluid unit having a measurement cell, a first light transmission member for transmitting light from a light source to the measurement cell, a second light transmission member for transmitting light from the measurement cell to a photodetector, a lens provided in the fluid unit so as to make the light from the first light transmission member incident on a first position that is different from the optical axis of the lens and/or emit light to the second light transmission member from a second position that is different from the optical axis of the lens, a pressure sensor for measuring the pressure of the fluid flowing through the measurement cell, and an arithmetic circuit connected to the photodetector for detecting the concentration of the fluid flowing through the measurement cell, wherein in order to correct the measurement error corresponding to the refractive index of the fluid, the arithmetic circuit is configured to determine the concentration of the fluid by calculation based on the output from the photodetector and a correction factor associated with the pressure output from the pressure sensor and the concentration of the fluid.

In an embodiment, the arithmetic circuit includes a memory for storing a table describing the correction factor associated with the pressure output from the pressure sensor and the concentration of the fluid, and measures the concentration using the correction factor read out from the table.

In an embodiment, the concentration measurement device further includes a temperature sensor for measuring the temperature of the gas flowing through the measurement cell, and the arithmetic circuit is configured to determine the volume concentration $Cv+\Delta Cn$ of the measurement gas in the mixed gas based on the following formula using an absorption coefficient $\alpha_a$ associated with the measurement gas:

$$Cv+\Delta Cn=(RT/\alpha_a LPt)\cdot\ln(I_0/I+I(n))=(RT/\alpha_a LPt)\cdot\ln(I_0/I)+\Delta Cn$$

where $I_0$ is intensity of the incident light incident on the measurement cell, I is intensity of the light passing through the measurement cell, R is an gas constant, T is the gas temperature in the measurement cell, L is the optical path length, Pt is the gas pressure in the measurement cell, I(n) is the change in light amount based on the change in the refractive index, and ΔCn is a correction factor determined based on $(RT/\alpha_d LPt)\cdot\ln(I_0/I)$ and the gas pressure.

Effect of Invention

According to the embodiment of the present invention, it is possible to suppress the measurement error due to the change in the refractive index of the medium in the measurement cell, and to perform concentration measurement with improved accuracy.

DETAILED DESCRIPTION OF EMBODIMENT

Embodiments of the present invention will be described below with reference to the drawings, but the present invention is not limited to the following embodiments.

Figure 1:
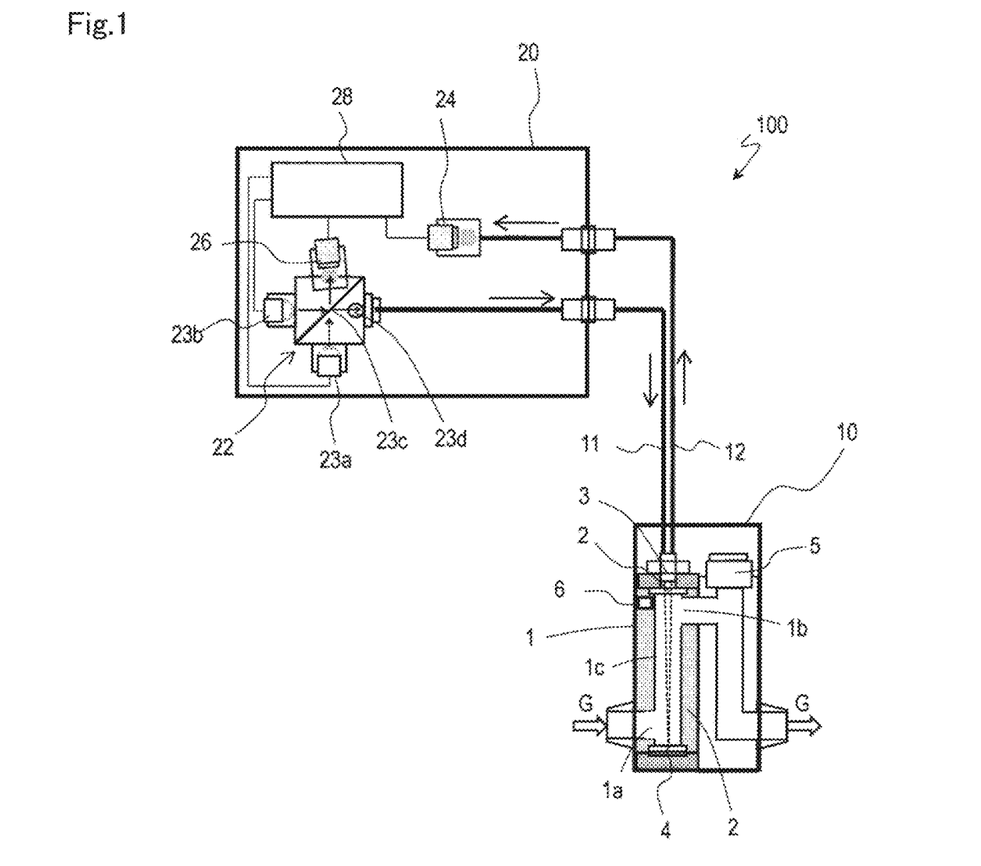
FIG. 1 is a schematic diagram showing an overall configuration of a concentration measurement device according to an embodiment of the present invention.

FIG. 1 is a diagram illustrating an example of the overall configuration of the concentration measurement device 100 used in the embodiment of the present invention. The concentration measurement device 100 includes a fluid unit 10 having a measurement cell 1 incorporated in a gas supply line, and an electric unit 20 arranged separately from the fluid unit 10. The fluid unit 10 and the electric unit 20 are optically and electrically connected by an optical fiber cable 11 for incident light (first optical transmission member), an optical fiber cable 12 for emission light (second optical transmission member), and a sensor cable (not shown).

The operating temperature of the fluid unit 10 is not particularly limited, for example, it may be used in a room temperature environment, and may be heated to about 100° C. to 200° C. depending on the species of the measurement gas. On the other hand, the electric unit 20 separated from the fluid unit 10 is usually disposed in a room temperature environment because of its low resistance to high temperature. To the electric unit 20, an external controller is connected for transmitting an operation control signal to the concentration measurement device 100 or receiving a measured concentration signal from the concentration measurement device 100.

The fluid unit 10 is provided with a measurement cell 1 having an inlet 1a, an outlet 1b of the measurement gas, and a flow path 1c connected to them and extending in the longitudinal direction. At one end of the measurement cell 1, a translucent or transparent window portion 2 (here, a sapphire plate) in contact with the flow path is provided, and a reflecting member 4 is provided at the other end of the measurement cell 1. In the present specification, the light includes not only visible light but also at least infrared light and ultraviolet light and may include electromagnetic waves of any wavelength. In addition, translucent means that the internal transmittance with respect to the light incident on the measurement cell is high enough to allow concentration measurement.

The wavelength of the measurement light can be appropriately selected based on the absorption characteristics of the gas to be measured. In the present embodiment, near-ultraviolet light (for example, the wavelength of 200 nm to 400 nm) is used to measure the concentration of an organometallic gas (for example, trimethylgallium (TMGa)) that absorbs ultraviolet light and to detect the water content.

In the vicinity of the window portion 2 of the measurement cell 1, a collimator 3 connected to two optical fiber cables 11 and 12 is attached. The collimator 3 has a convex lens 3A as a collimating lens (see FIG. 2), and is configured to make the light from the light source incident through the window portion 2 on the measurement cell 1 as parallel light, and receive the reflected light from the reflecting member 4. The reflecting surface of the reflecting member 4 is provided so as to be perpendicular to the traveling direction of the incident light or the central axis of the flow path. The flow path 1c of the measurement cell 1 is also used as an optical path of the measurement light.

As the window portion 2, a sapphire plate is suitably used because it has resistance and high transmittance in respect to the detection light used for concentration measurement such as near ultraviolet light, has resistance to gas (fluid) flowing through the measurement cell, and is mechanically and chemically stable. However, other stable materials such as quartz glass may also be used. The main body (flow path forming portion) of the measurement cell 1 is made of, for example, SUS316L.

The reflecting member 4 may be, for example, an aluminum layer or a dielectric multilayer film provided on the back surface of the sapphire plate as a reflective layer. If a dielectric multilayer film is used as the reflective layer, light of a specific wavelength range can be selectively reflected. The dielectric multilayer film is composed of a laminate of a plurality of optical thin films having different refractive indices (one in which the high refractive index film and the low refractive index film are alternately laminated), and by appropriately selecting the thickness and the refractive index of each layer, it is possible to reflect or transmit light of a specific wavelength. Further, since the dielectric multilayer film may be designed to reflect light at any arbitrary ratio, a portion of the light (e.g., 10%) may be transmitted and detected as a reference light by a photodetector installed in the lower portion of the reflecting member 4.

In addition, when the near-ultraviolet light is used as the measurement light as in the present embodiment, a windowing material of a calcium fluoride ($CaF_2$) system can be used for the windowing portion 2. In a calcium fluoride window material for ultraviolet light (for example, manufactured by SIGMAKOKI CO., LTD.), the transmittance of the ultraviolet light at about 300 nm is approximately 90% or more, and the refractive index is about 1.45. On the other hand, sapphire ($Al_2O_3$) has a transmittance of approximately 85% with respect to ultraviolet light of approximately 300 nm and a refractive index is approximately 1.81. As described above, compared with sapphire, calcium fluoride has a property of higher transmittance and a lower refractive index to ultraviolet light. Therefore, when the calcium fluoride window material is used, even when the change in the refractive index of the intra-cell medium occurs, the change in the optical path can be relatively small, and the occurrence of the concentration measurement error based on the change in the refractive index can be more effectively suppressed.

The fluid unit 10 also includes a pressure sensor 5 for detecting the pressure of the measurement gas flowing through the measurement cell 1, and a temperature sensor 6 for measuring the temperature of the measurement gas. The outputs of the pressure sensor 5 and the temperature sensor 6 are sent to the electric unit 20 via a sensor cable (not shown). The outputs of the pressure sensor 5 and the temperature sensor 6 are used to measure the gas concentration.

In the concentration measurement device 100 of the present embodiment, the electric unit 20 includes a light source 22 for generating light incident on the measurement cell 1, a photodetector 24 for receiving light emitted from the measurement cell 1, and an arithmetic circuit 28 for calculating the concentration of the measurement gas based on a detection signal (detection signal corresponding to the intensity of the received light) output from the photodetector 24.

The light source 22 is configured by using two light emitting elements 23a and 23b (here LED) for emitting ultraviolet light of different wavelengths from each other. Driving currents of different frequencies are applied to the light emitting elements 23a and 23b by using an oscillation circuit, and by performing frequency analysis (e.g., Fast Fourier Transform or wavelet transform), it is possible to measure the intensity of the light corresponding to each wavelength component from the detection signal by the photodetector 24. As the light emitting elements 23a and 23b, LD (laser diode) may also be used. Further, instead of using a multiplexed light of a plurality of different wavelengths as the light source, it is also possible to utilize a light source of a single wavelength, in this case, the multiplexer and the frequency analysis circuit may be omitted.

The light emitting elements 23a and 23b are arranged so as to both irradiate light at an angle of 45° with respect to a half mirror 23c. Further, a reference photodetector 26 is provided so as to face the light emitting element 23b across the half mirror 23c. A part of the light emitted from the light source 22 is incident on the reference photodetector 26 and is used to investigate degradation or the like of the optical element. The remaining light, after being condensed by a ball lens 23d, is incident to the optical fiber cable 11 for incident light. As the light receiving element for the photodetector 24 and the reference photodetector 26, for example, a photodiode or a phototransistor may be used.

The arithmetic circuit 28 is configured by, for example, a processor and a memory provided on a circuit board and includes a computer program for executing a predetermined calculation based on an input signal, and can be realized by a combination of hardware and software. Although the arithmetic circuit 28 in the illustrated embodiment is incorporated in the electric unit 20, it is needless to say that a part (CPU, etc.) or all of the components may be provided in a device outside the electric unit 20.

Figure 2:
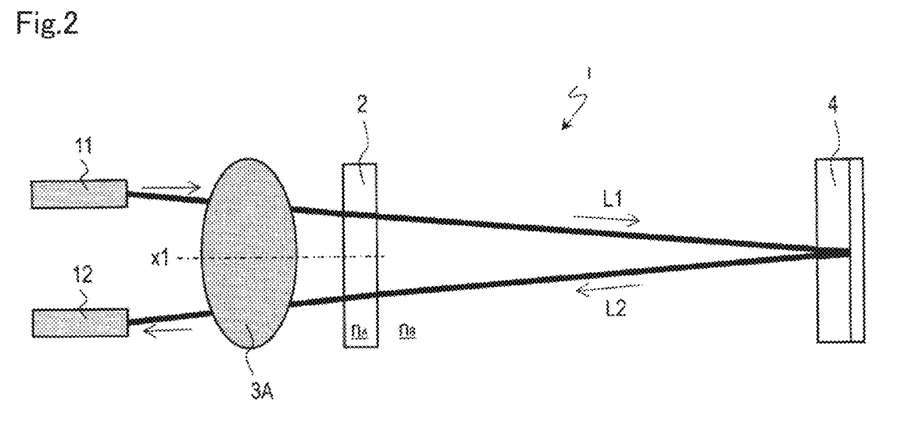
FIG. 2 is a diagram showing an optical system in the measurement cell of the concentration measurement device.

FIG. 2 shows an example of the optical path of the incident light L1 and the emitted light (reflected light) L2 in the measurement cell 1. As shown in FIG. 2, when using separate optical fiber cables 11 and 12 for incidence and emission, the incident light L1 and the reflected light L2 pass through a position in a convex lens 3A of a collimator deviated from the central or the optical axis x1 of the convex lens 3A.

In this case, the incident light L1 is incident on the window portion 2 provided in the measurement cell 1 at an angle slightly inclined from the normal direction to the window surface (or the axial direction of the measurement cell). Then, after being refracted by the window portion 2, it is emitted into the space inside the measurement cell 1.

Here, the following relationship is established according to Snell's law:

$$(\sin \theta_A / \sin \theta_B) = n_B / n_A = n_{AB}$$

where $n_A$ is the refractive index of the window portion 2 (medium A), $n_B$ is the refractive index of the medium B in the measurement cell, $\theta_A$ is the incidence angle from the window portion 2 to the intra-cell medium, and OB is the emission angle (refraction angle). Note that $n_{AB}$ in the equation is the relative refractive index of the medium B with respect to the medium A.

As can be seen from the above equation, the emission angle $\theta_B$ changes depending on the refractive index $n_B$ or the relative refractive index $n_{AB}$ of the intra-cell medium. Therefore, when the refractive index $n_B$ of the intra-cell medium changes, for example, when the inside of the cell changes from a vacuum to a measurement gas of a predetermined concentration, the emission angle $\theta_B$ and the optical paths of the lights L1 and L2 traveling in the cell also slightly change. Here, since $\sin \theta_B = n_A \cdot \sin \theta_A / n_B$, the emission angle $\theta_B$ becomes smaller as the refractive index $n_B$ or the relative refractive index $n_{AB}$ becomes larger.

Figure 3:
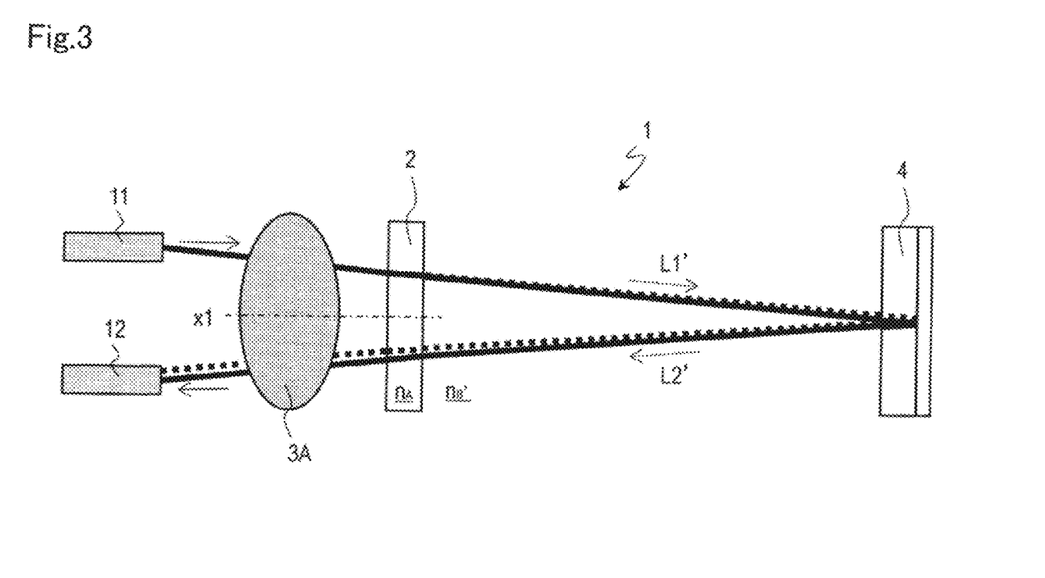
FIG. 3 is a diagram showing an optical system in the measurement cell when the refractive index of the intra-cell medium is changed.
Figure 4:
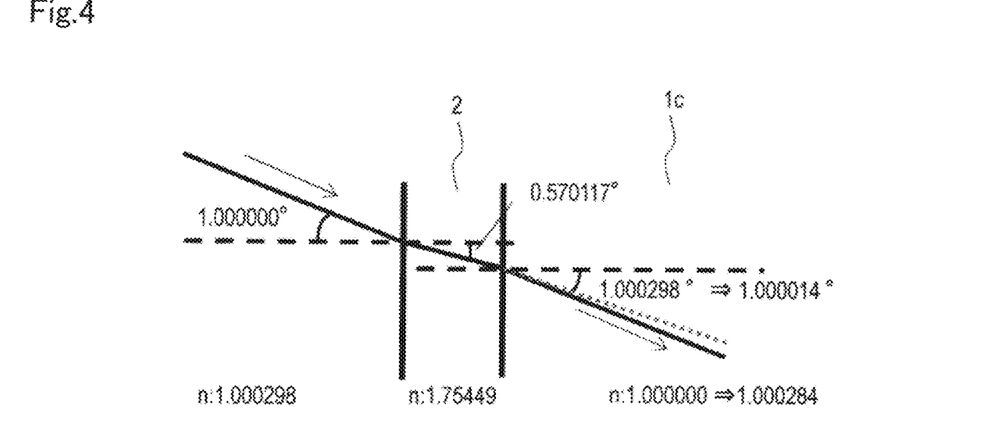
FIG. 4 is a diagram showing a change of the optical path in the vicinity of the window portion when the refractive index of the intra-cell medium is changed.

FIG. 3 is a diagram showing a change in the optical path when the inside of the measurement cell changes from vacuum to acetone/$N_2$ gas, where the incident light and reflected light passing through the acetone/$N_2$ gas are indicated by dashed lines as L1' and L2'. In addition, FIG. 4 is a diagram showing a change in the optical path when the outside (lens side) of the window portion 2 is air (nitrogen), the window portion is sapphire glass, and inside of the flow path 1c in the measurement cell is changed from vacuum to acetone gas at 200 Torr.

While the refractive index of the vacuum is 1.000000, the refractive index of acetone at 0° C., 1 atm is approximately 1.001079, and the refractive index of $N_2$ at the same is approximately 1.000298. Note that the refractive index of the Ar gas is approximately 1.000283, and the refractive index of $SF_6$ gas, which is used as a dry etching gas or a cleaning gas in a semiconductor manufacturing process, is approximately 1.000769. Further, in FIG. 4, the emission angle is calculated assuming that the refractive index of air is 1.000298, the refractive index of sapphire is 1.75449 (the wavelength of the incident light is 1060 nm), the refractive index of acetone at 200 Torr is 1.000284, and the incidence angle on the window material is 1°.

When the inside of the cell is changed from vacuum to acetone/$N_2$ gas, the refractive index $n_B$ of the medium is slightly increased, so that the refraction angle $\theta_B$ of light incident from the window portion 2 to the intra-cell medium is reduced. In the case of using a translucent plate in which a reflective layer is provided on a back surface side as a reflecting member, the refractive angle of light incident on the reflecting member 4 from the intra-cell medium and the refractive angle of light incident on the intra-cell medium from the reflecting member 4 also change slightly in accordance with the refractive index change of the intra-cell medium.

Consequently, as shown by a dashed line L1'L2' in FIG. 3, through an optical path different from that of vacuum, the reflected light L2' is incident on the optical fiber cable 12. Thus, there is a case where the reflected light intensity that can be detected is reduced, the measurement error based on the refractive index change occurs. When an optical system is designed so that the maximum amount of light is obtained in a vacuum, the larger the relative refractive index with respect to the vacuum of the intra-cell medium, the larger the measurement error tends to be. Depending on the design of the optical system, the measurement error may also decrease due to the increase in the refractive index of the intra-cell medium.

To give a specific example, as shown in FIG. 4, light incident on the sapphire window portion 2 at an incidence angle of 1.000000° (shown at a larger angle in FIG. 4 for clarity) is refracted at both interfaces of the window portion 2, when the inside of the cell is vacuum, it is emitted at an emission angle of 1.000298°. On the other hand, when the inside of the cell is filled with acetone having 200 Torr and 100% volume concentration, it is emitted at an emission angle of 1.000014°. This may cause the intensity of the light detected by the photodetector 24 (reference FIG. 1) to vary slightly, even in the absence of absorption by the gas.

Although there is a difference in measurement error depending on the refractive index of the intra-cell medium as described above, when a mixed gas such as acetone/$N_2$ gas is used, the refractive index of the intra-cell medium varies depending on the concentration of acetone in the mixed gas. More specifically, the higher the concentration of acetone having a higher refractive index, the larger the deviation of the optical path and the lower the measurement accuracy tends to be. However, in the case where the optical system is designed so as to obtain the maximum amount of light when the acetone concentration is 100% by volume, the measurement error may increase as the concentration of acetone decreases.

In addition, not only the concentration of the gas but also the pressure and temperature of the gas are related to the refractive index. The following equation represents the temperature and pressure dependences of the refractive index:

$$n(P,T)=1+(n(0°\ C.,1\ atm)/(1+\alpha T))\times P/1.01325\times 10^5$$

In the above equation, n(P, T) is the refractive index considering pressure and temperature, n(0° C., 1 atm) is the refractive index at 0° C. and 1 atm, α is an expansion coefficient, T is temperature, and P is pressure. In this manner, since the refractive index also changes with pressure, by performing correction based on the measurement result of the pressure sensor 5, it is possible to reduce the measurement error. Note that, as shown in the above equation, since the refractive index also changes with the temperature T, it is also possible to additionally perform correction according to the measured temperature by the temperature sensor 6.

Figure 5:
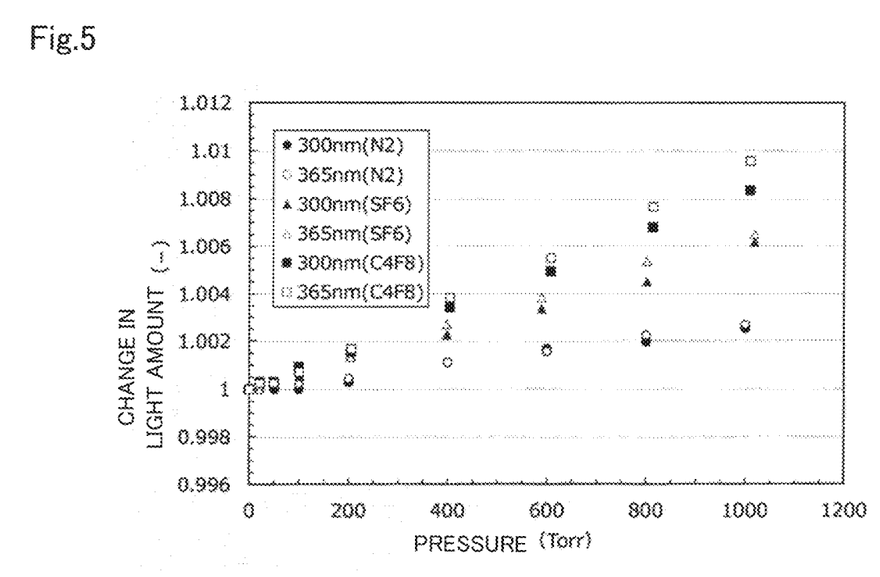
FIG. 5 is a graph showing the relationship between the gas pressure in the measurement cell (cell pressure) and the change in light amount.

FIG. 5 is a graph showing the relationship between the pressure of the intra-cell gas (Torr) and the change in the amount of light detected by the photodetector 24 (normalized based on the vacuum state value). Further, FIG. 6 shows the relationship between the refractive index on the horizontal axis and change in the amount of light, in which the refractive index is obtained from the above equation applied to the data shown in FIG. 5 on the assumption that the temperature T is constant at 23° C.

FIG. 5 shows the relationship between the pressure and the change in the amount of light for each of the $N_2$ gas, $SF_6$ gas, and $C_4F_8$ gas, when the measurement light wavelength is 300 nm, and when the measurement light wavelength is 365 nm. It has been confirmed that none of the $N_2$ gas, $SF_6$ gas, or $C_4F_8$ gas absorbs light with wavelengths of 300 nm and 365 nm. Further, FIG. 6 shows the relationship between the refractive index and the change in the amount of light for the $N_2$ gas and $SF_6$ gas.

Figure 6:
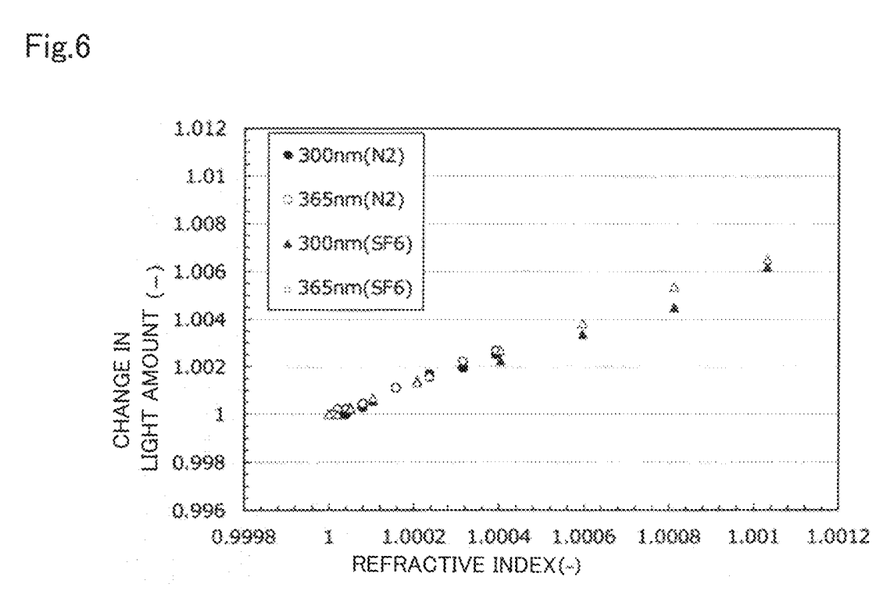
FIG. 6 is a graph showing the relationship between the refractive index of the gas in the measurement cell and the change in light amount.

As can be seen from FIGS. 5 and 6, there is a tendency that the change in the amount of light increases with an increase in the pressure of the intra-cell gas, and similarly, there is a tendency that the change in the amount of light increases with an increase in the refractive index. In addition, it can be seen that there is a similar tendency in the relationship between the refractive index and the change in the amount of light regardless of the gas species and the measurement light wavelengths. Thus, since there is a correlation between the refractive index and the pressure, in order to correct the increase in the measurement error due to the change in the refractive index (change in the amount of light), it is considered that it is preferable to perform correction according to the pressure.

Further, as described above, the refractive index also changes with the change in the concentration of the intra-cell gas. Therefore, by obtaining a correction factor based on the concentration and the pressure and correcting the concentration calculation using the correction factor, the concentration can be measured more accurately with the correction corresponding to the change in the refractive index.

Figure 7:
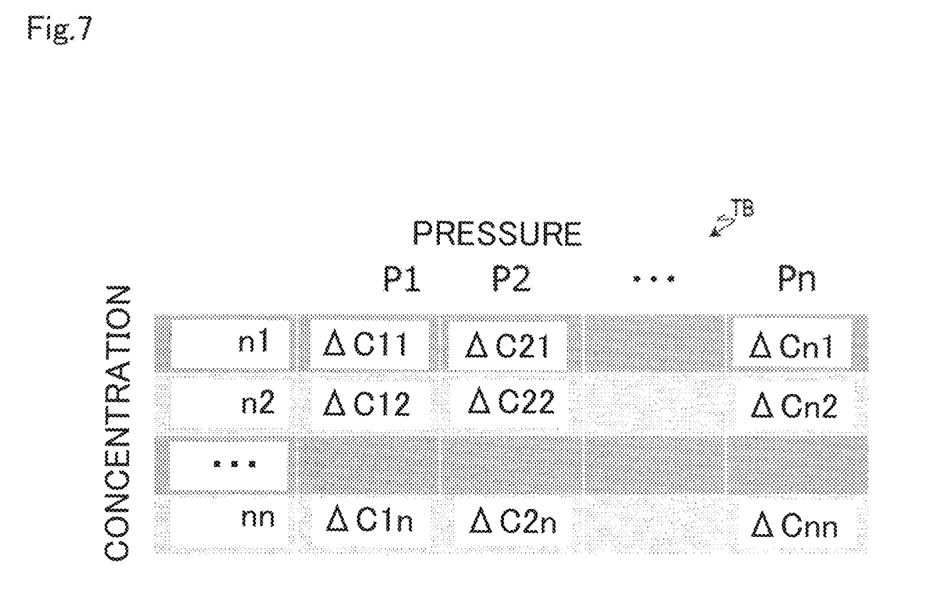
FIG. 7 is a diagram showing a table describing the concentration correction factor determined by the concentration of the gas and the pressure of the gas.

FIG. 7 shows a table TB recording the correction factor ΔCn of the concentrations associated with the pressures P1-Pn and the concentrations n1-nn. As shown in FIG. 7, a plurality of correction factors ΔC11 to ΔCnn corresponding to the concentrations n1 to nn and the pressures P1 to Pn are recorded in the table TB. As will be described later, when the concentration of the gas in the measurement cell is measured, the light intensity I of the reflected light may be measured, and the concentration may be obtained by calculation using the correction factor ΔCn read out from the table TB. This makes it possible to correct the error caused by the change in the amount of light due to the refractive index, but not the absorption by the gas, into concentration, and to perform concentration measurement with improved accuracy.

When the measured pressure or the concentration obtained by calculation from the absorbance is different from the pressure P1 to Pn or the concentration n1 to nn, the correction factor ΔCn corresponding to the closest pressure and concentration may be selected. In addition, for example, when the pressure is between P1 and P2 and the concentration is between n1 and n2, ΔCn may be determined from the average of ΔC11, ΔC21, ΔC12, and ΔC22, and an appropriate correction factor may be calculated from the correction factors ΔC11 to ΔCnn described in the table TB.

Hereinafter, a procedure of concentration measurement using the concentration measurement device of the present embodiment will be described. In the measurement cell 1 shown in FIG. 1, the optical path length of the light reciprocating inside the measurement cell 1 can be defined by twice the distance between the window portion 2 and the reflecting member 4. In the concentration measurement device 100, the light of wavelength λ incident on the measurement cell 1 and reflected by the reflective member 4 is absorbed depending on the concentration of the gas. Then, the arithmetic circuit 28 can measure the absorbance $A\lambda$ at the wavelength $\lambda$ by frequency analyzing the detection signal from the photodetector 24 and can further calculate the molar concentration $C_M$ from the absorbance AA based on the Lambert-Beer law expressed by the following equation (1):

$$A\lambda = -\log_{10}(I/I_0) = \alpha' L C_M \tag{1}$$

In equation (1), $I_0$ is the intensity of the incident light incident on the measurement cell, I is the intensity of light passing through the gas in the measurement cell, $\alpha'$ is the molar absorption coefficient (m²/mol), L is the optical path length (m), and $C_M$ is the molar concentration (mol/m³). The molar absorption coefficient $\alpha'$ is a coefficient determined by substance. $I/I_0$ is generally referred to as transmittance, and the absorbance AA becomes 0 when the transmittance $I/I_0$ is 100% and the absorbance AA becomes infinite when the transmittance $I/I_0$ is 0%. In addition, regarding the incident light intensity $I_0$ in the above equation, when there is no absorbing gas in the measurement cell 1 (e.g., when a gas that does not absorb ultraviolet light is filled, or when it is vacuumed), the intensity of the light detected by the photodetector 24 may be regarded as the incident light intensity $I_0$.

The concentration measurement device 100 may be configured to determine the concentration of the gas in consideration of the pressure and temperature of the gas flowing through the measurement cell 1. Specific examples will be described below. The above Lambert-Beer equation (1) holds up, but since the above molar concentration $C_M$ corresponds to the amount of substance of the gas per unit volume, it can be expressed as $C_M = N/V$, where N is the amount of substance (mol) or the number of moles of the gas and V is the volume (m³) of the gas. Then, since the object to be measured is a gas, the molar concentration $C_M = N/V = P/RT$ is derived according to the ideal gas low that $PV = NRT$. And when this is substituted into the Lambert-Beer equation and $-\ln(I/I_0) = \ln(I_0/I)$ is applied, the following equation (2) is obtained:

$$\ln(I_0/I) = \alpha L (P/RT) \tag{2}$$

In the equation (2), R is the gas constant=0.0623 (Torr m³/K/mol), P is the pressure (Torr), and T is the temperature (K). The molar absorption coefficient $\alpha$ in the equation (2) is with respect to the natural logarithm of transmittance and satisfies the relationship that $\alpha' = 0.434\alpha$ for $\alpha'$ in the equation (1).

Here, the pressure that can be detected by the pressure sensor is the total pressure Pt (Torr) of the mixed gas containing the measurement gas and the carrier gas. On the other hand, the gas related to the absorption is only the measurement gas, and the pressure P in the above equation (2) corresponds to the partial pressure Pa of the measurement gas. The partial pressure Pa of the measurement gas is expressed by $Pa = Pt \cdot Cv$ which is an equation expressed by the concentration Cv (volume %) of the measurement gas in the entire gas and the total pressure Pt. Therefore, in consideration of the pressure and the temperature, the relationship between the concentration (volume %) of the measurement gas and the absorbance can be expressed by the following equation (3) using the absorption coefficient as of the measurement gas from the equation (2):

$$\ln(I_0/I) = \alpha_a L (Pt \cdot Cv / RT) \tag{3}$$

In addition, the equation (3) is transformed to the following equation (4):

$$Cv = (RT/\alpha_a L Pt) \cdot \ln(I_0/I) \tag{4}$$

Therefore, according to the equation (4), based on the measured values (gas temperature T, total pressure Pt, and transmitted light intensity I), it is possible to determine by calculating the concentration of the measurement gas (volume %) at the measurement light wavelength. In this manner, the concentration of the absorption gas in the mixed gas can be obtained in consideration of the gas temperature and the gas pressure. Note that the absorption coefficient $\alpha_a$ of the measurement gas can be determined in advance according to the equation (3) or (4) from the measured values (T, Pt, I), when a measurement gas having a known concentration (e.g., 100% concentration) is flowed. The absorption coefficient $\alpha_a$ obtained in this manner is stored in the memory, and the in coefficient $\alpha_a$ can be read out from the memory and used when performing the concentration calculation of the measurement gas of unknown concentration based on the equation (4).

However, as described above, it is considered that the transmitted light intensity I detected by the photodetector 24 includes the change in the amount of light caused by the change in the refractive index of the intra-cell medium. Since this change in the amount of light based on the refractive index is not caused by the absorption of the gas, it is preferable to correct the change in the amount of light due to the change in the refractive index when the absorbance and the concentration are more accurately determined. The equation of the concentration Cv' considering the refractive index n is given by the following equation (5):

$$Cv' = (RT/\alpha_a L Pt) \cdot \ln(I_0/I(n)) \tag{5}$$

where I(n) represents the transmitted light intensity considering the refractive index of the intra-cell medium, and $I(n) = I + \Delta I(n)$, i.e., the sum of the transmitted light intensity I detected by the photodetector and the light intensity change due to the refractive index.

Assuming that the amount of change (error amount) of the concentration measurement caused by the amount of change $\Delta I(n)$ of the light intensity based on the refractive index change is $\Delta Cn$, the equation for the concentration in consideration of the refractive index change is given by the following equation (6):

$$Cv + \Delta Cn = (RT/\alpha_a L Pt) \cdot \ln(I_0/(I + \Delta I(n))) = (RT/\alpha_a L Pt) \cdot \ln(I_0/I) + \Delta Cn \tag{6}$$

Therefore, the concentration Cv before correction is calculated according to the above equation (4), and $\Delta Cn$ indicating the change in the light intensity of the refractive index is specified with reference to the table TB shown in FIG. 7, whereby the concentration in which the change in the refractive index is compensated can be obtained. The $\Delta Cn$ described in the table TB is determined by the pressure and the concentration as described above and is obtained by measuring the change in the light intensity (change in the output of the photodetector 24) when the concentration of the measurement gas and the pressure in the cell are changed using light with a wavelength that is not absorbed by the measurement gas.

While the concentration measurement device according to the embodiment of the present invention has been described above, the present invention is not limited to the above embodiment, and various changes can be made without departing from the spirit of the present invention. For example, in correspondence to the species of the gas, a light in a wavelength region other than the ultraviolet region can be used as the measurement light.

INDUSTRIAL APPLICABILITY

The concentration measurement device according to the embodiments of the present invention is used for semiconductor manufacturing equipment or the like and is suitably utilized for measuring the concentration of various gases.

REFERENCE SIGNS LIST

1 Measurement cell
2 Window portion
3 Collimator
3A Convex lenses
4 Reflective member
5 Pressure sensor
6 Temperature sensor
10 Fluid unit
11 Optical fiber cable (for incident light)
12 Optical fiber cable (for emitting light)
20 Electric unit
22 Light sources
24 Photodetector
26 Reference photodetector
28 Arithmetic circuit
100 Concentration measurement device

What is claimed is:

1. A concentration measurement device comprising:
an electric unit having a light source and a photodetector;
a fluid unit having a measurement cell;
a first optical transmission member for transmitting light from the light source to the measurement cell;
a second optical transmission member for transmitting light from the measurement cell to the photodetector;
a lens provided in the fluid unit and arranged such that an incident light from the first optical transmission member is incident on a first position that is different from an optical axis of the lens, and arranged to emit an emission light to the second optical transmission member from a second position that is different from the optical axis of the lens and the first position;
a pressure sensor for measuring a pressure of a fluid flowing through the measurement cell; and
an arithmetic circuit connected to the photodetector for determining the concentration of the fluid flowing through the measurement cell,
wherein the arithmetic circuit has a memory for storing a table describing a correction factor associated with a pressure output from the pressure sensor and a concentration of the fluid and is configured to determine the concentration of the fluid by calculation based on the output of the photodetector and the correction factor read out from the table, in order to correct the measurement error corresponding to the refractive index of the fluid in the measurement cell, which is caused by at least a change of an optical path in the measurement cell.

2. The concentration measurement device according to claim 1 further comprising:
a temperature sensor for measuring the temperature of the gas flowing through the measurement cell;
wherein the arithmetic circuit is configured to calculate the volume concentration $Cv+\Delta Cn$ of the measurement gas in a mixed gas based on the following equation using an absorption coefficient $\alpha a$ associated with the measurement gas:

$$Cv+\Delta Cn=(RT/\alpha_a LPt)\cdot \ln(I_0/I+I(n))=(RT/\alpha_a LPt)\cdot \ln(I_0/I)+\Delta Cn$$

where $I_0$ is the intensity of incident light incident on the measurement cell, I is the intensity of light passing through the measurement cell, R is a gas constant, T is the gas temperature in the measurement cell, L is an optical path length, Pt is the gas pressure in the measurement cell, $I(n)$ is a light amount change based on the refractive index change, and $\Delta Cn$ is a correction factor determined on the basis of $(RT/\alpha_a LPt)\cdot \ln(I_0/I)$ and the gas pressure.

3. The concentration measurement device according to claim 1, wherein the correction factor is measured by using a light unabsorbed in the measurement cell.

* * * * *